United States Patent [19]

Talbot

[11] 3,795,774

[45] Mar. 5, 1974

[54] TELEPHONE COMMUNICATION SYSTEM WITH AUXILIARY UNIT FOR CALL TRACING

[76] Inventor: Earl J. Talbot, 930 S. Atlantic Ave., Cocoa Beach, Fla. 32931

[22] Filed: Dec. 9, 1971

[21] Appl. No.: 206,278

[52] U.S. Cl. .............................. 179/18 FH, 179/5.5
[51] Int. Cl. .............................................. H04m 3/42
[58] Field of Search ............ 179/18 FH, 5.5, 27 DB

[56] References Cited

UNITED STATES PATENTS

| | | | |
|---|---|---|---|
| 3,137,770 | 6/1964 | Doyle | 179/18 FH |
| 3,541,269 | 11/1970 | Fritschi | 179/18 FH |
| 3,521,001 | 7/1970 | Pearce | 179/18 FH |
| 3,385,933 | 5/1968 | Abert | 179/18 FH |
| 3,627,933 | 12/1971 | Garrett | 179/18 FH |

*Primary Examiner*—Kathleen H. Claffy
*Assistant Examiner*—David L. Stewart
*Attorney, Agent, or Firm*—Roger L. Martin, Esquire

[57] ABSTRACT

A telephone communication system has an alarm system that includes an auxiliary unit for locking up the central office equipment involved in a completed telephone call and which is actuatable by the called party by dialing a predetermined number while the communication circuits are complete. A switch responsive to the relay in the called party's energized circuit is used in sensing pulse signals emanating from the called party telephone to actuate the alarm system and a tone signal responsive relay may also be used. The line locking unit has a self locking relay and appropriately responsive switches that complete circuits for maintaining the sleeve circuits of the parties and other circuits which short out the ring and tip lines of each party to prevent equipment release due to opening of the telephone hook switches. The alarm system contemplates a monitoring system and which is coupled to the talking circuits when the alarm system is actuated.

26 Claims, 3 Drawing Figures

Figure 1:
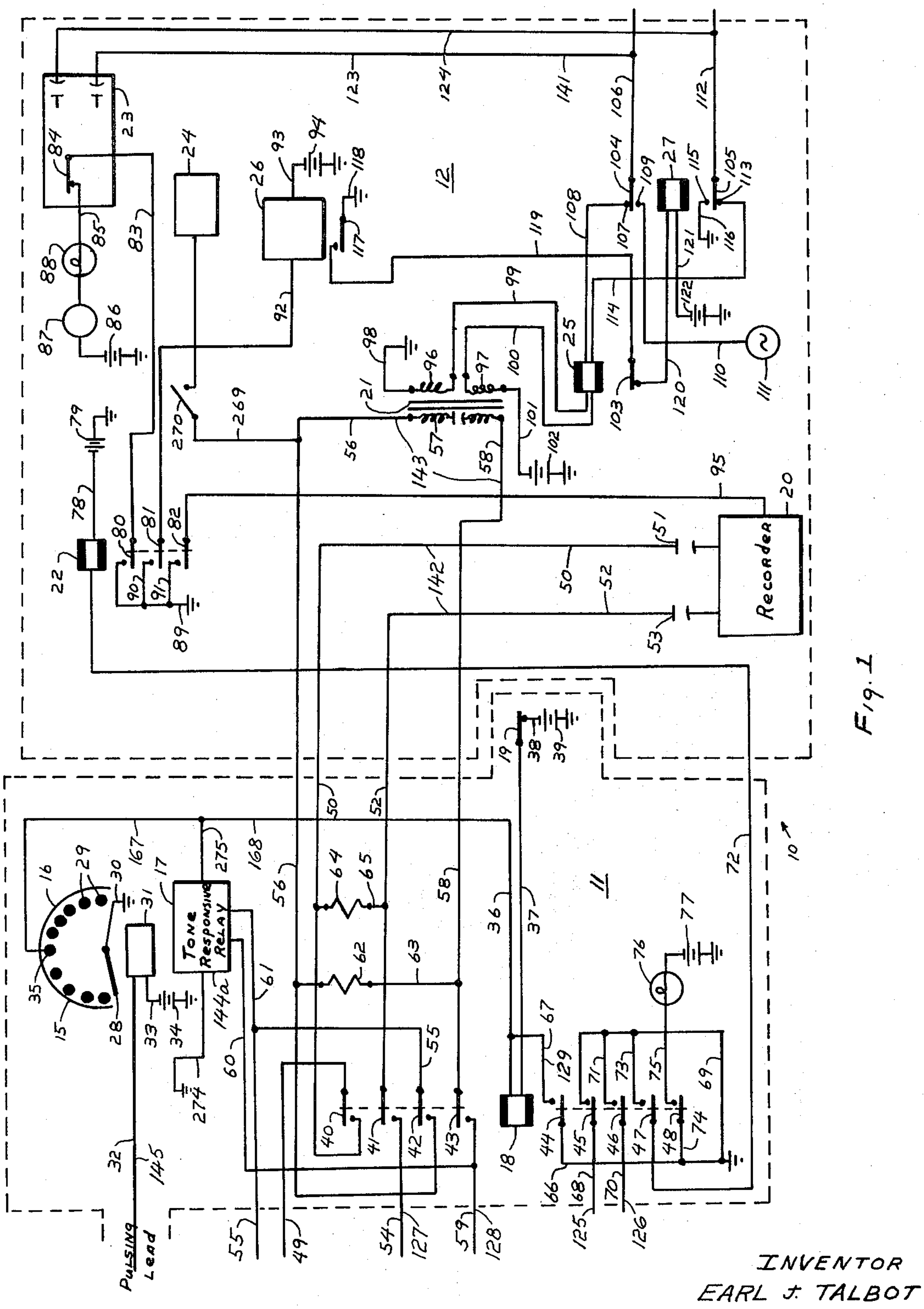

INVENTOR
EARL J. TALBOT

By Roger L. Martin
ATTORNEY

INVENTOR
EARL J. TALBOT

By Roger L. Martin
ATTORNEY

INVENTOR
EARL J. TALBOT

By Roger L. Martin
ATTORNEY

TELEPHONE COMMUNICATION SYSTEM WITH AUXILIARY UNIT FOR CALL TRACING

The invention relates to a telephone communication system that includes central office exchange equipment and which embodies an auxiliary line locking unit that is under the control of the party called in a completed telephone communication circuit between calling and called parties utilizing the exchange equipment and that is actuated by the called party through the simple manipulation of the dial signal generating component of the called party's telephone.

It is common knowledge that telephone communication systems are being used by perverts, revolutionaries, and others under circumstances where law enforcement officials would like to secure evidence leading to the identity of the calling party. Revolutionaries and anarchists, for example, frequently place time bombs in areas exposed to the public and thereafter prior to the detonation of the bomb device, call a police station with the intent of triggering an evacuation of the area so as to minimize personal injuries before the secreted bomb device is detonated. In other situations, private citizens are subjected to what are commonly called "obscene telephone calls" which emanate from perverts and other deranged individuals whose identity is difficult to ascertain.

The tracing of a completed telephone communication circuit is a time consuming task done manually in central office exchange areas and is only possible to accomplish if the communication circuit remains completed. Such circuits however, can be broken by either the calling or called party through the simple process of "hanging up" on the other party. Each telephone is equipped with a so-called "hook switch" and when either party hangs up, the hook switch is caused to open and thereby break the communication circuit. This fact is relied on by the calling party in the situations referred to above to avoid detection.

It is well known that when a telephone communication circuit is completed between calling and called party telephones that sleeve circuits associated with the respective parties are energized and serve to lock in the central office exchange equipment that establishes the talking circuit between the communicants. It is also known that the talking circuit established by the exchange equipment includes ring and tip lines that are series connected with the hook switch of the calling party telephone in an energized circuit loop as well as ring and tip lines that are associated with the called party telephone and series connected with the hook switch in an energized circuit loop. These ring and tip lines associated with the respective calling and called party telephones are capacitance coupled during the establishment of the talking circuit and it is also well known that in the establishment of the talking circuit separate relays in the central office equipment become associated with the calling and called party telephones and form components of the separately energized circuits that involve the ring and tip lines associated with the calling and called parties. In the process of establishing the completed telephone communication circuit, the relay associated with the calling party telephone is first energized while the relay associated with the called party's telephone is energized thereafter and as the called party, in response to the audible summons, removes the receiver and permits the hook switch to complete the loop circuit involving the relay associated with his telephone. Apart from the relays associated with the calling and called party telephones, the central office equipment that establishes the talking circuit also normally includes a third relay which operates in dependency upon the relay associated with the calling party telephone. This third relay serves to maintain the sleeve circuits and when actuated, completes these circuits that basically maintain the calling and called party loops.

The central office exchange equipment used in establishing talking or communication circuits includes circuit completing control or switching units that serve to control the maintenance of the talking circuits completed by the equipment. One of these units is automatically selected in establishing a talking circuit between calling and called party telephones and the unit has switching devices that serve to complete the energized calling and called party loop and sleeve circuits as well as capacitance means for coupling the loop circuits to establish the communication circuit between the parties. The selected unit also includes the relays previously referred to, and the continued operation of the unit to maintain the energized circuits depends upon closed conditions for the telephone hook switches involved in the communication circuit as is well known in the art.

A general oject of the invention is to provide auxiliary equipment which can be controlled by a called party to lock in circuits involved in the completion of a telephone communication circuit so as to facilitate the tracing of the telephone involved in the communication.

Another object of the invention is to provide improvements of the kind contemplated above and which avoid the need for special adaptation of the calling and called party telephones. Yet another object is to provide improvements of the kind contemplated in telephone communication systems and which avoids the need for major modifications in the telephone exchange equipment used in servicing telephone subscribers. A further object, of course, is to provide modifications in telephone communication systems and which enable police authorities and others to uncover evidence leading to the identity of calling parties using the communication system and involved in illegal activities.

The invention has various aspects and in accord with one aspect the circuit completing control units of a telephone communication system are equipped with auxiliary line locking units that can be actuated by the called parties for maintaining the energized conditions of the sleeve circuits completed by the control units. The auxiliary units can be actuated to accomplish their intended function by the manual manipulation of the dialing component of the called party telephone involved in the communication circuit. As is well known such components are manipulatable to generate signals that are associated with the digits in telephone numbers. In those communication systems which involve telephones with dialing components that produce one or more pulses when a digit is dialed, use is made of the response of the relay associated with the called party's telepohne in the control unit completing the talking circuit to actuate a switch in a pulse sensing circuit of a relay mechanism that is responsive to a predetermined number of the pulses and completes a circuit involving a relay having one or more switches that upon actuation maintain the energy conditions of the sleeve circuits established by the exchange equipment. In most communication systems that involve step-by-step central office exchange equipment maintenance of the energized sleeve circuits will enable technicians to establish the calling and called party telephones even though one or the other of the parties involved in the communication hangs up and thereby breaks the energized loop circuits involving the ring and tip lines of the parties.

Although practically all of the telephone exchanges in use in the United States today operate in dependency upon pulse signals which are either generated directly by circuit breaking dial switching devices well known in the art or indirectly by tone generating and tone responsive pulse generating components of the telephone, it is recognized that those telephones equipped with tone generators provide a tone signal to the talking circuit if actuated under circumstances where the telephone is the called party telephone in a completed communication circuit. Accordingly, certain aspects of the invention have to do with the use of a tone responsive relay which is coupled to the talking circuit established by the exchange equipment and which completes a circuit that energizes the line locking unit relay contemplated above. Other aspects of the invention and which will become more apparent subsequently have to do with the provision of switching means which are actuated by the line locking relay and which lock the relay in an energized condition which can only be relieved by actuation of switching components located at the central office.

It is also recognized that certain central office equipment, principally those operating with a crossbar switching system, have time delayed link releasing equipment which is actuated when either the calling or called party opens their hook switch and thereby breaks the energized circuits involving the relay associated with the party. One aspect of the invention has to do with the provision in the auxiliary line locking unit of switching means which upon actuation provides electrically conductive paths in the energized loop circuits and which are in parallel with the hook switches of the calling and called party telephones so as to prevent the time delayed equipment from carrying out the intended function. Other aspects of the invention have to do with an alarm system which utilizes the line locking unit and wherein a monotiring system is associated with the unit and has one or more communication circuits that are coupled to the talking circuit by actuation of the line locking relay.

Figure 2:
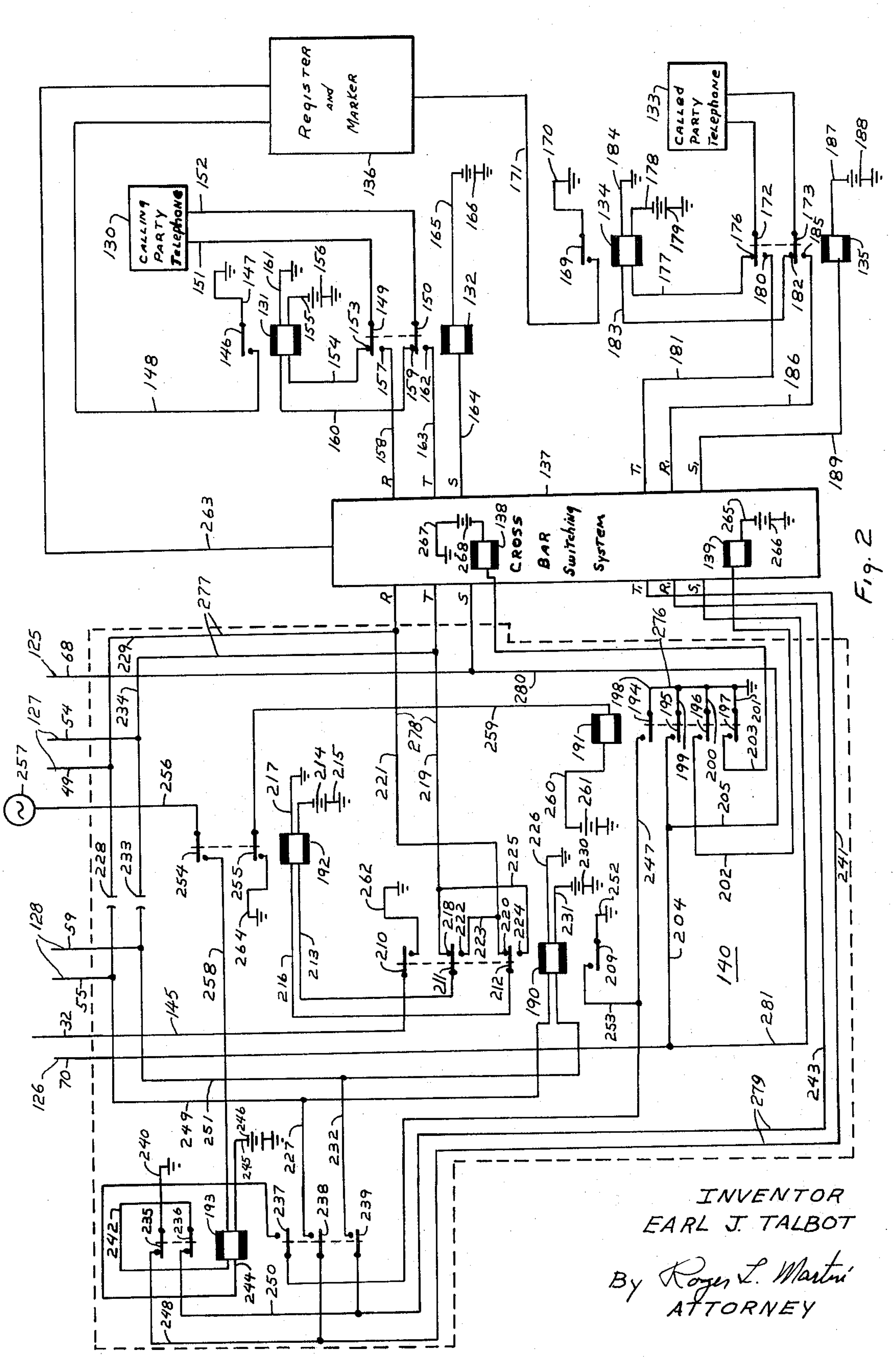
Figure 3:
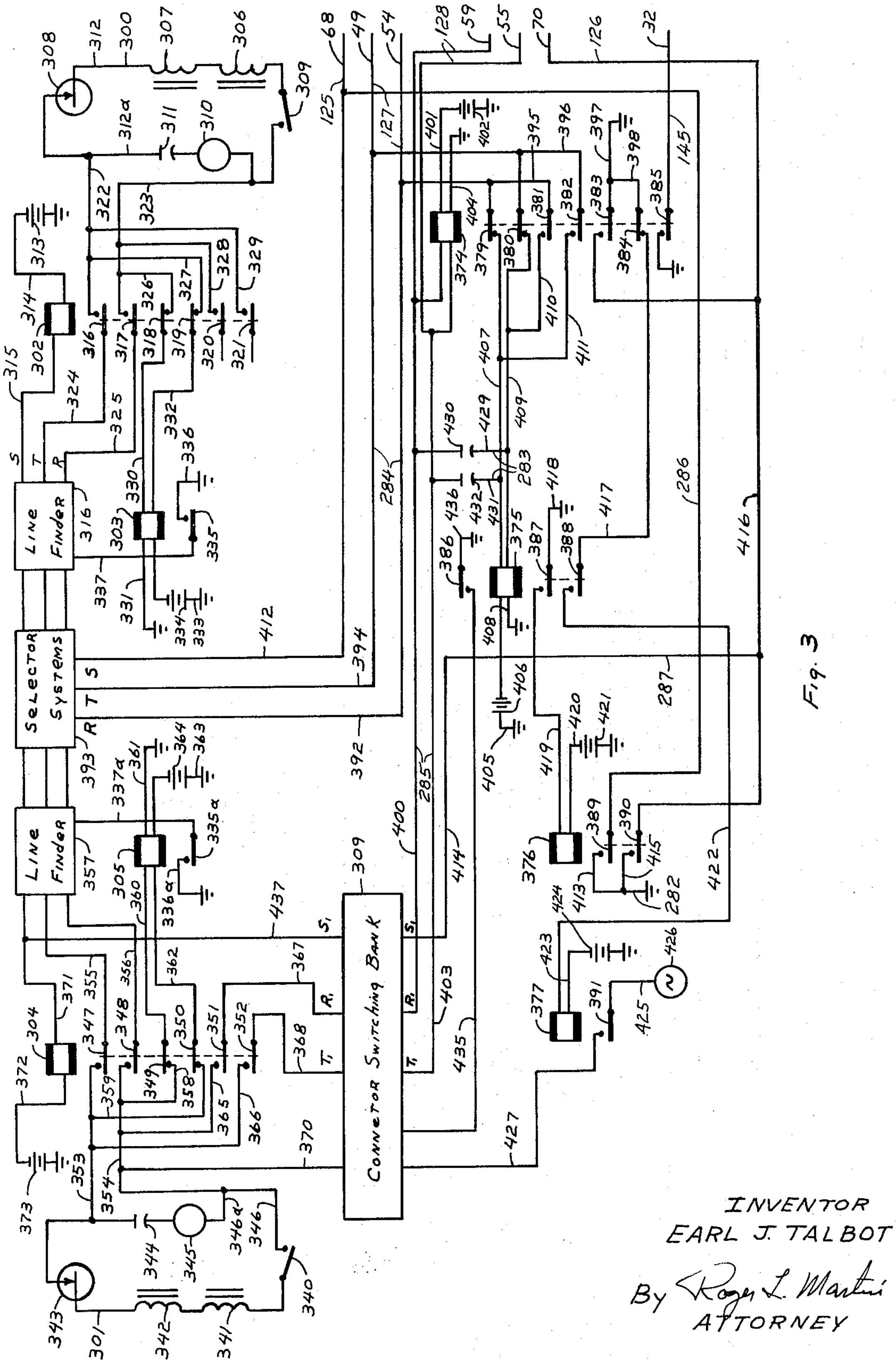

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 1 schematically illustrates an alarm system insofar as it includes components that may be appropriately connected to the central office exchange equipment to service one or more telephones serviced by the equipment;

FIG. 2 schematically illustrates a communication system involving calling and called party telephones that are connected through central office exchange equipment having a crossbar switching system, the components of the central office equipment being illustrated in their normal state and as modified for connection with the alarm system of FIG. 1; and FIG. 3 schematically illustrates a communication system involving calling and called party telephones that are connected through central office equipment of the step-by-step exchange type, the components in the system being shown in their normal condition with the exchange equipment modified to provide a suitable connection with the alarm system shown in FIG. 1.

Reference is now made to the drawings and more particularly to FIG. 1 and wherein the alarm system 10 is depicted as including an auxiliary line locking unit 11 and a monitoring system 12.

As will be subsequently seen, the alarm system is actuated by the called party in a completed telephone communication circuit by simply dialing a predetermined number through the manual manipulation of the dial signal generating component of the called party's telephone. The embodiment illustrated is actuated when the called party in a completed telephone communication circuit dials the digit or number five although it will be apparent that the signals representing any of the other numbers or digits available in the dialing equipment may be used to formulate a basis for actuation of the alarm system.

Most telephone exchange equipment in use is solely responsive to pulse signals and the locking unit 11 includes a pulse signal responsive relay 15 for actuating the alarm system in response to pulse signals generated by the called party. It also includes however, a tone signal responsive relay 17 for actuating the alarm system in those situations where the called party telephone has a dial signal generating component of the tone signal generating type that is coupled directly to the talking circuit as opposed to being coupled to a tone signal decoder having a pulse signal output.

In addition to relays 15 and 17, unit 11 includes an electromechanical relay 18, a single sole, single throw switch 19 which is normally closed when the unit is in the ready condition to perform its line locking function, and a plurality of switches which will be subsequently described and which are actuated and operated by relay 18.

The monitoring system 12 may be coupled to serve one or more line locking units at the central office exchange but is illustrated in the embodiment as only servicing one such unit. System 12 may include various different types of equipment for carrying out the monitoring function in the central offic area or for relaying the conversation between the calling and called parties to other locations over suitable communication circuits. In the illustration, system 12 has one communication circuit 142 that includes a voice recorder 20 and another communication circuit 143 that includes an inductance coupling 21 with suitable leads for establishing a talking path to a police station telephone serviced by the exchange and which are appropriately tapped to provide an auxiliary communication circuit 141 to a central office monitoring telephone 23. Other equipment used in the monitoring system depicted include an electromechanical relay 22, a tracing tone generator 24, an interrupter 26 and electromechanical relays 25 and 27.

With specific reference to the components of the line locking unit 11, the pulse sensing relay 15 is shown as including a switch 16 that has a wiper blade 28 which is adapted to sweep a plurality of contacts 29. The wiper blade 28 is electrically connected to ground by lead 30, and is mechanically coupled through a suitable ratchet mechanism to a solenoid designated at 31. One side of the solenoid coil is connected to ground by a lead 33 containing a battery 34 while the other side of the solenoid coil is connected to a lead 32. Solenoid 31 and lead 32 form a component of a pulse sensing circuit 145 that is adapted to sense pulse signals generated by the called party in a completed telephone communication circuit and each time the pulse signal is sensed solenoid 31 advances the wiper blade 28 one of the contacts of switch 16. Consequently, when the called party dials the digit or number five, five circuit breaking pulses are produced in the talking circuit and the solenoid is actuated five times to advance the wiper blade 28 into contact with the fifth contact 35 of switch 16. Contact 35 is connected by lead 36 to one side of the coil of relay 18 and the other side of this coil is connected by lead 37 to the pole piece of switch 19. The contact of switch 19, on the other hand, is connected by lead 38 to ground through battery 39 as seen in the drawings. Switch 19 is normally closed and accordingly, when the wiper blade 28 engages contact 35 a circuit 167 is completed wich energizes relay 18. Relay 15 has an automatic reset mechanism and as will be subsequently seen, appropriate switching means are provided to maintain the energized condition of relay 18 once the unit 11 has been actuated. Circuit 145, as will be subsequently seen, is connected to a switching unit that is automatically actuated in the establishment of a talking circuit between calling and called parties and with the relay switching arrangement provides a means for detecting a predetermined pulse signal in the switching unit for rendering the locking unit operative.

The tone signal responsive relay 17 has appropriate leads 61 and 60 which, as will be subsequently seen, are coupled to the talking circuit of the completed telephone communication circuit interconnecting the called and calling parties so that when the tone associated with the digit five is sensed it completes a circuit 168 involving ground line 274, line tap 275, lead 36, relay 18, lead 37, switch 19 and battery containing ground line 38 and which like relay 15 energizes relay 18. Relay 17 also has reset features which break the circuit once relay 18 is actuated. As will be subsequently seen, relay 17 is also connected to the automatically selected switching unit in an arrangement that provides a means for detecting a predetermined tone signal in the switching unit and which is generated by the called party when the telephone generating means produces tones associated with the digits in the talking circuit.

Relay 18 is associated with a bank of normally opened single pole, single throw switches that are designated at 40 through 48 inclusive. These switches are mechanically coupled and simultaneously actuated when the coil of relay 18 is operatively energized.

The pole piece of switch 40 is electrically connected to lead 49 while the contact of this switch is connected to recorder 20 via a capacitor 51 containing lead 50. The pole piece of switch 41 is also connected to recorder 20 by means of a capacitor 53 containing lead 52 while the contact of switch 41 is connected to another lead 54. Leads 49 and 54 are connected to the calling party's tip and ring lines when the telephone communication circuit is completed and leads 50 and 52 provides a communication circuit 142 with recorder 20 which is completed to the talking circuit when relay 18 is actuated to close switches 40 and 41.

The pole piece of switch 42 is connected to lead 55 and the contact of this switch is connected by lead 56 to one side of the input coil 57 of inductance 21. The pole piece of switch 43 is connected by lead 58 to the other side of the input coil 57 while the contact of switch 43 is connected to lead 59. Leads 55 and 59 are electrically connected to the called party's tip and ring lines in the completed telephone communication circuit and leads 56 and 58 form components of a communication circuit 143 of the monitoring system and which is coupled to the talking circuit when switches 42 and 43 are closed by the relay action.

Leads 56 and 58 are electrically interconnected through a resistor 62 containing lead 63 and leads 50 and 52 are electrically interconnected through a resistor 64 containing lead 65. As will be subsequently seen, lead 65 forms a component of an open electrically conductive path 127 that is connected to the calling party's tip and ring lines in parallel with the calling party's hook switch and which is closed when relay 18 is actuated to close switches 40 and 41. Lead 63, on the other hand, forms a component of an open electrically conductive path 128 which is connected to the called party's tip and ring lines in parallel with the called party's hook switch and which is also completed when relay 18 is actuated. Resistors 62 and 64 preferably correspond to the normal resistance through a party telephone and may be more or less about 900 ohms each so as to maintain the communication circuits of the monitoring system.

The pole piece of switch 44 is connected to ground line 66 and the contact of this switch is connected by lead 67 to lead 36. When relay 18 is energized switch 44 is closed and this establishes a relay locking energized circuit 129 that includes ground line 66, switch 44, lead 67, the coil of relay 18, lead 37, switch 19, and battery containing ground line 38. This permits the sensing relays to reset and yet locks in relay 18 so that all the switches are closed and requires manipulation of switch 19 in order to release the locking unit and the telephone lines effected thereby.

The pole piece of switch 45 is connected to lead 68 and the contact for switch 45 is connected by lead 69 to a suitable tap in ground line 66. Lead 68 is connected to the energized calling party's sleeve circuit when the telephone communication circuit is completed and the arrangement is such as to provide a conductive path 125 in the sleeve circuit which is basically parallel to that established by the relay action in the central office equipment which establishes the communication circuit and hence prevents the calling party's sleeve circuit from becoming de-energized once switch 45 has been closed by the action of relay 18.

The pole piece of switch 46 is connected to lead 70 and the contact for switch 46 is connected by line tapping lead 71 to lead 69. Lead 70 is connected to the energized called party's sleeve circuit when the telephone communication circuit is completed and the arrangement is such as to provide a conductive path 126 in the called party's sleeve circuit and which is basically parallel to that established by the relay action the central office equipment that establishes the communication circuit and hence prevents the called party's sleeve circuit from becoming de-energized.

The pole piece of switch 48 is connected by lead 74 to a suitable tap in ground line 66 and the contact for switch 48 is connected by lead 75 to ground through an incandescent lamp 76 and battery 77. When switch 48 is closed by the action of relay 18 lamp 76 is energized to provide a visual signal at the central office that locking unit 11 is in use.

The contact of switch 47 is connected by lead 73 to a suitable tap in grounded lead 69 while the pole piece for switch 47 is connected by lead 72 to one side of the coil of relay 22. The other side of the relay coil is connected by line 78 to ground through battery 79. As such, when relay 18 of the locking unit is energized switch 47 is closed to complete a circuit tht energizes relay 22 of the monitoring system.

Relay 22 has a plurality of normally opened, single pole, single throw switches designed at 80, 81 and 82 respectively and which are mechanically coupled for simultaneous actuation when the relay coil is energized. The contact of switch 80 is connected to ground line 89 and the contact for switches 81 and 82 are connected by leads 90 and 91 to suitable taps in line 89. The pole piece of switch 80 is connected by lead 83 to the pole piece of a normally closed, single pole, single throw switch 84 that has a contact which is connected by line 85 to ground through a battery 86, DC buzzer 87, and incandescent lamp 88. Accordingly, when switch 80 is closed by the relay action, audio and visual signals result which call attention to central office personnel that the monitoring system is in use so that the central office personnel can thereafter listen in to the conversation by means of telephone 23.

The pole piece of switch 82 is connected by lead 95 to recorder 20 and when switch 82 is closed by the relay action lead 95 is grounded to complete an energized circuit which actuates the recorder 20.

The output side of inductance 21 includes a pair of coils 96 and 97. One side of coil 96 is connected to ground line 98. Relay 25 includes a pair of coils and the other side of coil 96 is connected by lead 99 to one of the relay coils while one side of coil 97 is connected by lead 100 to one side of the other of the relay coils. The other side of coil 97 is connected by lead 101 to ground through battery 102. Relay 25 has a normally closed single pole, single throw switch 103, and relay 27 has a pair of single pole, double throw switches designated at 104 and 105 respectively. The pole piece of switch 104 is connected to an output lead 106 and normally engages switch contact 107. contact 107 is electrically connected by lead 108 to the other side of the relay coil that is electrically connected to lead 99 and the other contact 109 of switch 104 is connected by lead 110 to ring current source 111. The pole piece of switch 105 is connected to output lead 112 in the monitoring unit depicted and normally engages switch contact 113. Contact 113 is electrically connected by lead 114 to the other side of the relay coil which is electrically connected to lead 100 and the other contact 115 of switch 105 is connected to ground line 116.

The interrupter 26 includes a single pole, single throw normally opened switch 117 having a pole piece that is connected to ground line 118. The contact of switch 117 is connected by lead 119 to the pole piece of the normally closed, single pole, single throw switch 103 of relay 25. The contact for switch 103 is connected by lead 120 to one side of the coil of relay 27 and the other side of this coil is connected by lead 121 to ground through battery 122. Telephone 23 in the monitoring unit depicted is coupled by leads 123 and 124 to the output leads 106 and 112 of the monitoring unit, and leads 106 and 112 may comprise the tip and ring leads of a link to a remote telephone located, for example, at a police or other surveillance station.

The monitoring system also includes a tracing tone generator 24 which is connected to the contact of a normally opened single pole, single throw switch 270 having a pole piece which is connected by lead 269 to a suitable tap in lead 56.

When switch 81 is closed by the relay action a circuit is completed which energizes interrupter 26. This causes switch 117 to successively close and open and thereby successively energize and de-energize the coil of relay 27. When relay 27 is energized the pole pieces of switches 104 and 105 engage contacts 109 and 115 respectively and this completes a ring circuit to the telephone service by ring and tip leads 106 and 115. When the telephone is answered the hook switch closes and completes a communication circuit from the output side of inductance 21 to the surveillance telephone and simultaneously energizes relay 25. This opens switch 103 and de-energizes relay 27 so that a communication circuit is completed to the surviellance telephone.

The operation of the alarm system will first be explained in conjunction with a completed call between calling and called parties that are linked together through a central office telephone exchange having a crossbar switching system. Reference is accordingly made to FIG. 2 and wherein the calling party's telephone is designated at 130. Telephone 130 has a line relay 131 at the central office and also has a line hold magnet or relay 132. The called party's telephone serviced by the exchange is designated at 133 and the line relay and hold magnet associated with the telephone 133 are designated at 134 and 135 respectively. It will be understood by those skilled in the art that each of the telephones 130 and 133 is equipped with a hook switch and a digit dialing component that are connected in series.

The register and marker of the central office equipment is designated at 136 and the crossbar switching system 137 is seen as having an originating line hold magnet or relay 138 and a terminating line hold magnet or relay 139 and which are associated with the telephone communication circuit that is established by the central office equipment. Those familar with the establishment of a talking circuit between calling and called party telephones serviced by central office exchange equipment utilizing a crossbar switching system are aware that during the establishment of the communication circuit a juncture switching unit is automatically selected from among a plurality of such units. The juncture switching unit involved in the completion of the talking circuit 277 between telephones 130 and 133 is designated at 140 and is seen as tapped by lead 70, 32, 55, 59, 49, 54 and 68 that electrically interconnect the juncture control unit 140 with the line locking unit 11.

Line relay 131 is arranged to actuate a normally opened, single pole, single throw switch 146 that has a pole piece connected to ground line 147 and a contact which is connected by lead 148 to the register and marker system 136. Relay 132 is arranged to actuate a pair of single pole, double throw switches that are designated at 149 and 150. Pole piece of switch 149 is connected to the ring lead 151 of telephone 130 and the pole piece of switch 150 is connected to the tip lead 152 of telephone 130. The pole piece of switch 149 normally engages contact 153. Relay 131 has a pair of coils and contact 153 is electrically connected by lead 154 to one side of one of the coils while the other side of the coil is connected by lead 155 to ground through battery 156. The other contact 157 of switch 149 is connected by lead 158 to the crossbar switching system 137. The pole piece of switch 150 normally engages contact 159, and this contact is connected to one side of the other coil of relay 131 by lead 160. The other side of this coil is connected to ground line 161. The other contact 162 of switch 150 is connected by lead 163 to the crossbar switching system 137. One side of the coil of relay is connected by lead 164 to switching system 137 while the other side of the coil is connected by lead 165 to ground through battery 166.

The called party's line relay 134 is arranged to actuate a single pole, single throw switch 169 that has a pole piece which is connected to ground line 170. The contact of switch 169 is electrically connected to the register and marker system 136 by lead 171.

The line hold magnet 135 associated with the called party's telephone 133 is arranged to actuate a pair of single pole, double throw switches 172 and 173. The pole pieces of switches 172 and 173 are respectively connected to the ring and tip leads 174 and 175 of telephone 133. The line relay 134 also has a pair of coils, and the pole piece of switch 172 normally engages the contact 176 that is connected to one side of one of the coils by lead 177 while the other side of the coil is connected by lead 178 to ground through battery 179. The other contact 180 of switch 172 is connected by lead 181 to switching system 137. The pole piece of switch 173 normally engages contact 182 in the depicted arrangement and this contact is connected by lead 183 to one side of the other coil of relay 134 while the other side of this coil is connected to ground line 184. The other contact 185 of switch 173 is connected by lead 186 to switching system 137. One side of the coil of relay 135 is connected by lead 187 to ground through battery 188, and the other side of this coil is connected to lead 189 to the crossbar switching system 137.

The juncture control unit 140 that is selected in completing the telephone communication circuit includes electromechanical relays designated at 190, 191, 192 and 193. Relay 191 operates under the control of, and thus in dependency upon the relay action of relay 192 to maintain the sleeve circuits associated with the talking circuit completed through the control unit and is arranged to actuate and operate, in the system depicted, four normally opened, single pole, single throw switches designated at 194, 195, 196 and 197. The pole piece of switch 194 is electrically connected to ground line 198 and the pole pieces of switches 195, 196 and 197 are connected by lines 199, 200 and 201 respectively to suitable line taps in ground line 198.

The contact of switch 196 is connected by lead 202 to the crossbar switching system 137 and in the course of completing the telephone communication circuit between the called and calling party's telephones is connected to one side of the terminating line hold magnet of system 137. This magnet 139 is connected by lead 265 to ground through battery 266 and accordingly, the terminating line hold magnet is energized when switch 196 closes in response to relay 191.

The contact of switch 197 is connected by lead 203 to the crossbar switching system 137 and in the course of completing the telephone communication circuit is connected to one side of the originating line hold magnet of system 137. The other side of this magnet 138 is connected to ground by lead 267 through battery 268 so that when switch 197 is closed by relay 191 the originating line hold magnet is also energized.

The contact of switch 195 is electrically connected by lead 204 to the crossbar switching system 137 and when switch 195 is closed by relay 191 lead 204 is grounded and basically energizes and completes the called party's sleeve circuit 281. In the juncture switching or control unit illustrated, lead 205 is electrically connected to the switching system 137 and also electrically connected to lead 204 by a suitable line tap. Lead 205 forms a components of the calling party's sleeve circuit 280 and accordingly, when switch 195 is closed by relay 191 lead 205 is grounded to complete the energized calling party's sleeve circuit 280.

The contact of switch 194 is connected by lead 247 to one of the switches of relay 193 and as will be subsequently seen, forms a component of the circuit which energizes relay 193.

Relay 190 is associated with a pair of normally opened, single pole, single throw switches 209 and 210 and with a pair of single pole, double throw switches designated at 211 and 212. Relay 192 has a pair of coils, and the pole piece of switch 211 is connected by lead 213 to one side of one of the coils while the other side of the coil is connected to ground through battery 214 by means of lead 215. The pole piece of switch 212 is connected by lead 216 to one side of the other coil of relay 192 while the other side of this coil is connected to ground line 217. The pole piece of switch 211 normally engages contact 218 and this contact is electrically connected by lead 219 to the crossbar switching system 137. The pole piece of switch 212 normally engages contact 220 and this contact is also electrically connected by lead 221 to the crossbar switching system 137. The remaining contact 222 of switch 211 is electrically connected to lead 221 by means of lead 223 while the remaining contact 224 of switch 212 is electrically connected to lead 219 by lead 225. Leads 221 and 219 form components of the calling party's ring and tip line when the telephone communication circuit is completed and also form components of an energized calling party loop circuit 278 that includes relay 192 and the hook switch of the calling party telephone 130.

Relay 190 has a pair of coils and one side of one of the coils is electrically connected to ground line 226 while the other side of the coil is connected by lead 227 to the open contact of switch 238 that is actuated and operated by relay 193. One side of the other coil of relay 190 is connected to ground through battery 230 by means of lead 231 and the other side of this coil is connected by means of line 232 to the contact of another switch 239 that is actuated by relay 193. The pole piece of switch 238 is connected by lead 241 to the crossbar switching system and in the completed telephone communication circuit forms a component of the tip line connection with the called party's telephone 133. The pole piece of switch 239 is also connected to the crossbar switching system 137 by a lead designated at 243 and this lead forms a component of the called party's ring line when the telephone communication circuit is completed.

In addition to the normally opened, single pole, single throw switches 238 and 239 that are actuated by relay 193, the relay is arranged to actuate another normally opened, single pole, single throw switch 237 as well as a pair of normally closed, single pole, single throw switches designated at 235 and 236. As previously indicated, the pole piece of switch 237 is connected by lead 247 to the open contact of switch 194.

Relay 193 has a pair of coils and the contact of switch 237 is connected by lead 244 to one side of one of the coils while the other side of the coil is connected to ground through battery 246 by means of lead 245. One side of the other coil of relay 193 is connected to the pole piece of switch 236 by means of lead 242 while the other side of the coil is connected by lead 258 to the contact of switch 254. The contact of switch 236 is electrically connected to a suitable tap in lead 243 by means of lead 250. The pole piece of switch 235 is connected to ground line 240 and the contact of this switch is connected by lead 248 to a suitable tap in lead 241. Leads 241 and 243 form components of an energized called party loop circuit 279 that includes relay 190 and the hook switch of the called party's telephone 133 when the telephone communication circuit is completed.

The pole piece of switch 209 is connected to ground line 252 while the contact of this switch is connected by lead 253 to a suitable tap in lead 247.

Relay 192 has a pair of normally opened, single pole, single throw switches designated at 254 and 255. The pole piece of switch 254 is connected by lead 256 to an external ring current source 257 and the contact of this switch is connected by lead 258 to one side of the relay coil which is connected to lead 242. The pole piece of switch 255 is connected by lead 259 to one side of the relay 191 controlled by relay 192 and the other side of this coil is connected by lead 260 to ground through battery 261. The contact of switch 255 on the other hand, is connected to ground line 264.

The ring and tip lines of the calling and called party's telephones are coupled through capacitors designated at 228 and 233 in establishing the completed telephone communication circuit. One side of capacitor 228 is connected by lead 229 to a suitable tap in lead 221 while the other side of this capacitor is connected by lead 249 to a suitable tap in lead 227. One side of capacitor 233 is connected by lead 251 to a suitable tap in lead 232 while the other side of this capacitor 233 is connected by lead 234 to a suitable tap in lead 219.

In connecting the alarm system to the juncture control unit 140, the called party's sleeve lead 204 in the juncture is tapped by lead 70 and the calling party's sleeve lead 205 in the juncture is tapped by lead 68. The tip and ring lines for the called party juncture circuit are tapped by leads 55 and 59 respectively while the tip and ring lines for the calling party in the juncture are tapped by leads 49 and 54. To provide a pulse sensing circuit 145 lead 32 is connected to the pole piece of a normally opened, single pole, single throw switch 210 which is actuated by relay 190 and the contact of this switch is connected to ground line 262.

In the normal process of initiating a telephone call, the calling party initially closes the hook switch (not shown) of telephone 130 and this energizes relay 131 and closes switch 146 to energize the circuit that activates the register and marker system. Once activated, an appropriate signal as by means of line 263 is relayed to system 137 and this activates the system 137 and grounds line 164 so that relay 132 is energized to establish a link between telephone 130 and system 137 that includes ring and tip circuits involving switches 149 and 150. In the process of establishing this link, switches 149 and 150 disengage contacts 153 and 159. This de-energizes relay 131 and opens switch 146.

Once the link between the calling party's telephone 130 and switching system 137 is established, the called party's telephone number is dialed by the calling party 130 through manipulation of the dial pulse generator (not shown). This provides a series of ground pulse signals in the circuit connecting the switching system 137 and telephone 130 and which is relayed by means not shown to system 136 and thereat interpreted to provide suitable signals which then control and activate system 137 into establishing a link between the calling party's telephone 130 and the called party telephone 133. In the process of establishing the link, a juncture switching unit, such as that depicted at 140, is selected. Once this control unit 140 is selected relay 192 is energized by the completion of the series calling party loop circuit 278 involving ground line 217, switch 212, switch 149, the calling party telephone 130, switch 150, switch 211, and battery containing ground line 215. This results in the actuation of the switches 254 and 255 controlled by relay 192.

When switch 254 closes due to the action of relay 192 it connects the ring current source 257 through switches 254 and 236 to the contact 185 of switch 173. Simultaneously, with the closure of switch 254, switch 255 is closed by the action of relay 192 and this energizes relay 191 and closes switches 194, 195, 196 and 197. When switch 196 closes it energizes the terminating line hold magnet or relay 139 of system 137 and this locks in the called party's tip, ring and sleeve lines through the crossbar switching system. When switch 197 closes the originating line hold magnet or relay 138 is energized and this locks in the ring, tip and sleeve lines of the calling party through the switching system 137. The closure of switch 195 grounds the calling party's sleeve circuit 280 and maintains line hold relay 132 in an energized state and it also energizes the called party's sleeve circuit 281 and hence energizes and maintains line hold relay 135. This results in the actuation and closure of switches 172 and 173 and completes a circuit through contacts 180 and 185 that connects the ring current source 257 to ground line 240 through switches 235 and 236 and also through switches 172 and 173 so that ringing current is applied to the called party telephone.

When switch 194 is closed by relay 191 it grounds the pole piece of switch 237 and basically places relay 193 in condition to be locked in when the relay is energized. In the normal process of completing the talking path, the called party closes the hook switch of telephone 133 in response to the audio summons of the telephone bell. When this happens the impedance in the ring circuit is lowered so that the coil attached to leads 242 and 258 is sufficiently energized to actuate the relay 193. When this happens switches 235 and 236 are opened and this breaks the ring circuit and de-energizes the coil connected to leads 242 and 258. Simultaneously however, switch 237 is closed by the relay action. This completes a circuit between ground line 198 and battery containing ground line 245 through switches 237 and 194 and which energizes the other coil of relay 193 and maintains the relay in an energized state.

When switches 238 and 239 close, the called party loop circuit 279 is completed between ground line 226 and battery containing line 231 by way of switches 238, 239, 172 and 173 and the called party's telephone which energizes relay 190. When relay 190 is energized switch 209 is closed to provide an auxiliary ground connection for the circuit energizing relay 193. The relay also actuates switches 211 and 212 and moves the pole pieces into contact with switch contacts 222 and 224 respectively. This switching action reverses the current in the ring and tip lines of the calling party's loop circuit 278 for reasons which are well known to those skilled in the art.

Relay 190 is the last relay which is actuated in the juncture switching unit 140 and it forms a component of the energized called party loop circuit 279 that includes the called party's hook switch and pulse signal generating unit. Consequently, if the called party actuates the pulse generator when the telephone communication circuit between the calling and called party telephones is completed, the circuit is interrupted by the pulse signals so that the switches controlled by the relay are momentarily released then actuated again with each pulse signal. Advantage is taken of this in providing the sensing circuit for the line locking unit by selecting a switch such as switch 210 that is responsive to the relay 190 in the energized called party's loop circuit. As seen in FIG. 2, the contact of switch 210 is connected to ground line 262 while the lead 32 of the pulse signal responsive relay 15 is connected to the pole piece. As such, each pulse sensed by the action of switch 210 breaks the pulse sensing circuit 145 involving ground line 262 and battery containing ground line 33 and de-energizes the solenoid to move the wiper blade 28 one contact.

When the relay action is completed in the juncture control unit 140, a talking circuit 277 is completed which includes capacitors 228 and 233, the ring and tip lines leading therefrom to the calling party's telephone 130 and the ring and tip lines leading therefrom to the called party's telephone. The talking circuit 277 thus includes a capacitance coupled energized calling and called party loop circuits. As is evident from FIG. 2, relay 192, and hence the relay 191 controlling maintenance of the circuitry 276 that energizes the various line holding means maintaining the talking circuit, operates in dependency upon the energized condition of the calling party loop 278, and thus depends upon the closed hook switch condition of the calling party telephone.

With the talking path completed and the sleeve circuits 280 and 281 energized all the called party has to do to operate the alarm system is to manually manipulate the dialing component by dialing the digit five in the embodiment depicted. This interrupts the current to relay 190 and causes the switch 210 to successively open and close in accord with the pulse signals eminating from the called party's telephone. The pulses thus sensed cause the wiper blade 28 to engage contact 35 and this actuates and renders the line locking unit operative and energizes relay 18 through the completion of circuit 167. As previously indicated, this causes switches 40 through 48 to close and locks in the relay 18 for reasons of the circuit 129 completed by the closure of switch 44 so that the relay can thereafter only be de-energized by opening switch 19.

With the telephone communication circuit completed, switch 195 forms a component of the energized calling party's sleeve circuit 280 and also forms a component of the called party's energized sleeve circuit 281. By virtue of lead 68 and the ground connection to ground line 66, switch 45 is connected to the energized calling party's sleeve circuit 280 in parallel with switch 195 and hence actuation of relay 18 completes an electrically conductive path 125 in the energized calling party sleeve circuit 280 which is in parallel with the grounded switch 195 and prevents the sleeve circuit 280 from being de-energized. The switch 195 is also similarly connected with respect to the called party's energized sleeve circuit 281. However, switch 46 is also provided and by virtue of lead 70 is connected to the called party's sleeve circuit 281 in parallel with the relay switch 195 in juncture 140. Accordingly, when relay 18 is actuated it also completes an electrically conductive path 126 in the energized called party sleeve circuit 281 which is in parallel with switch 195 and serves to maintain the called party's sleeve circuit energized.

Switches 40 and 41 normally form components of an open electrically conductive path 127 which includes leads 65 54 and 49 and which is connected in the calling party's loop circuit 278 in parallel with the calling party's hook switch. When relay 18 is actuated switches 40 and 41 close to electrically interconnect the calling party's ring and tip lines of the loop circuit 278 through the conductive path 127 and this prevents the calling party from de-energizing relay 192 by opening the hook switch.

Switches 42 and 43 are also normally opened and as such, form components of an open electrically conductive path 128 which includes leads 63 59 and 55 and which is connected to the tip and ring lines of the called party loop circuit 279 in parallel to the called party's hook switch. Accordingly, when relay 18 is energized and switches 42 and 43 are closed a short is placed through the conductive path 128 across the called party's ring and tip lines and which basically prevents the called party after actuating the line locking unit from de-energizing relay 190 by hanging up and thus opening his hook switch.

Actuation of the line locking unit accordingly not only closes switches which maintain the energized conditions of calling and called party's sleeve circuits but it also shorts out the ring and tip lines of each of the parties so that the juncture control unit remains energized until the line locking unit is released through the manipulation of switch 19.

As previously indicated, once the line locking unit has been actuated, recorder 20 is energized so that any conversation between the called and calling parties is recorded over the communication circuit 142 provided by leads 50 and 52. Similarly, telephone 23 is connected to the talking path so that the conversation can be monitored at the central office and provisions are made for the communication to also be monitored at an exterior surveillance telephone.

With the system locked up by the action transpiring in unit 11, central office personnel can readily trace the calling and called circuits by procedures well known to those skilled in the art and Reference is now made to FIG. 3 and wherein the communication system is depicted as being established through a step-by-step central office exchange. In this instance the calling party's telephone 300 has a line holding or cutoff relay 302 and a line relay 303 that are associated with the telephone 300 in the central office equipment of the exchange. The called party telephone 301 similarly has a line holding or cutoff relay 304 and a line relay 305 that are located in the central office exchange.

Telephone 300 includes a transmitter 306, a receiver 307, a dialing component 308 and a hook switch 309 that are connected in line 312 and in series with the ring and tip leads 322 and 323 of the telephone. The bell 310 and capacitor 311 of the telephone ring circuit are connected in series in line 312*a* and to the leads 322 and 323 in parallel with the telephone components in line 312.

One side of relay 302 is connected to ground through battery 313 by means of lead 314 and the other side of the relay is connected by lead 315 to the line finder 316 servicing the calling party's telephone 300.

Cutoff relay 302 is associated with and arranged to actuate normally open, single pole, single throw switches 316 and 317, normally closed, single pole, single throw switches 318 and 319, and normally open, single pole, single throw switches 320 and 321.

The contacts of switches 316 and 317 are electrically connected to the ring and tip lead 322 and 323 while the pole pieces for these switches 316 and 317 are electrically connected to the central office line finder 316 by leads 324 and 325. The contact of switch 318 is connected by lead 326 to a tap in line 323 and the contact for switch 319 is electrically connected by lead 327 to a tap in line 322. The contact of switch 320 is electrically connected by lead 328 to a line tap in lead 323 and the contact for switch 321 is connected by lead 329 to a line tap in lead 322.

The pole pieces for switches 320 and 321 are connected to the connector switching bank (now shown) that services the calling party's telephone 300 on incoming calls.

Relay 303 has a pair of coils and one side of one of the coils is connected by lead 330 to the pole piece of switch 318 while the other side of this coil is connected to ground line 331. The other coil of relay 303 is connected by lead 332 to the pole piece of switch 319 while the other side of the coil is connected to battery 334 containing ground line 333.

Line relay 303 is associated with a normally opened, single pole, single throw switch 335 and the contact of this switch is connected to ground line 336 in the illustrated embodiment while the pole piece is electrically connected by lead 337 to line finder 316.

The called party's telephone 301 includes a normally opened, single pole, single throw hook switch 340, a receiver 341, a transmitter 342 and a dial pulse generator 343 that are series connected in line 346 and connected in series with the tip and ring leads 353 and 354 which communicate with the central office equipment. The ring circuit of the telephone includes capacitor 344 and bell 345 which are connected in series in line 346*a* and to suitable taps that provide a parallel arrangement with the other components of the telephone.

The cutoff relay 304 associated with the called party's telephone is associated with normally opened, single pole, single throw switches 347 and 348, normally closed, single pole, single throw switches 349 and 350 and normally opened, single pole, single throw switches designated at 351 and 352. The contacts of switches 347 and 348 are electrically connected to the tip and ring leads 353 and 354 and the pole pieces of these switches are connected by leads 355 and 356 to the line finder 357 associated with the called party's telephone. As seen in the drawings, the contact of switch 349 is connected by lead 358 to a tap in lead 354 while the contact of switch 350 is connected by lead 359 to a tap in lead 353.

The line relay 305 associated with the called party's telephone has a pair of coils, and the pole piece of switch 349 is connected by lead 360 to one side of one of the coils while the other side of the coil is connected to ground line 361. The pole piece of switch 350 on the other hand is electrically connected by lead 362 to one side of the other coil for the line relay 305 and the other side of this coil is connected by lead 363 to ground through battery 364.

The contact of switch 351 is electrically connected by lead 365 to the line tap in lead 354 and the contact of switch 352 is connected by lead 366 to a line tap in lead 353. The pole pieces for switches 351 and 352 are connected by leads 367 and 368 to the connector switching bank 309 that services the called party's telephone, and the connector bank 309 is also electrically connected to lead 354 by means of lead 370.

Relay 304 is electrically connected by lead 371 to the line finder 357 which services the called party, and is further connected by lead 372 to ground through battery 373.

Line relay 305 associated with the called party telephone 301 includes a single pole, single throw switch 335a having a pole piece which is connected by lead 337*a* to line finder 357 while the contact of this switch is connected to ground line 336*a*.

The connector servicing the called party telephone includes a connector switching and wiper bank 309 and a relay switching system that includes a plurality of relay switching units that can be automatically selected during the completion of the telephone communication circuit. FIG. 3 schematically illustrates relays 374, 375, 376 and 377 and which are associated with the circuit completing relay switching unit selected by the selector system 393 in the completion of the telephone circuit. Like the juncture units of the prior embodiment, the circuit completing relay switching or control units in the step-by-step system serve to control the maintenance of the talking circuits completed through the unit.

As seen in FIG. 3, relay 374 is arranged to actuate a pair of normally closed, single pole, single throw switches 379 and 380, three normally opened, single pole, single throw switches 381, 382 and 383, another normally closed, single pole, single throw switch 384, and yet another normally opened, single pole, single throw switch 385.

Relay 375 is arranged to actuate three normally opened, single pole, single throw switches that are designated at 386, 387 and 388 while relay 376 is arranged to actuate a pair of normally opened, single pole, single throw switches designated at 389 and 390. Relay 377 is arranged to actuate a normally opened, single pole, single throw switch designated at 391.

In the relay switching unit depicted in FIG. 3, the pole piece of switch 379 is electrically connected by lead 392 to the selector system 393 and the pole piece of switch 380 is electrically connected to the system 393 by means of lead 394. The pole piece of switch 381 is electrically connected by lead 395 to a line tap in lead 392 and the pole piece of switch 382 is connected by a lead 396 to a tap in lead 394. The pole piece of switch 383 is connected to ground line 397 and the pole piece of switch 384 is connected by lead 398 to a tap in ground line 397. Insofar as switch 385 is concerned, the pole piece of this switch is connected by lead 32 to the auxiliary line locking unit shown in FIG. 1 when the unit is adapted for use with the communication system depicted in FIG. 3.

Relay 374 has a pair of coils and one side of one of the coils is connected by lead 400 to switching bank 309 while the other side of the coil is connected to ground through battery 402 containing line 401. One side of the other coil of relay 374 is connected by lead 403 to the switching bank 309 while the other side of this coil is connected to ground line 404.

Relay 375 has a pair of coils and one side of one of the coils is connected by lead 405 to ground through battery 406. The other side of this coil is connected by lead 407 to the contact of switch 379. One side of the other coil of relay 375 is connected to ground line 408 and the other side of this coil is connected by lead 409 to the contact of switch 380. The contact of switch 381 is electrically connected by means of lead 410 to a tap in line 409 and the contact of switch 382 is electrically connected by lead 411 to a tap in lead 407.

In the illustration, the pole piece of relay switch 389 is connected by lead 412 to the selector system 393 and the contact of this switch is connected to ground line 413. The pole piece of switch 390 is connected by lead 414 to the switching bank 309 and the contact of this switch 390 is connected by lead 415 to ground line 413.

The contact of switch 383, as seen in the drawings, is connected by lead 416 to a line tap in lead 414 while the contact of switch 384 is connected by lead 417 to the pole piece of switch 388. The pole piece of switch 387 is connected to ground line 418 while the contact of this switch 387 is connected by lead 419 to one side of the coil of relay 376. The other side of this coil is connected by means of line 420 to ground through battery 421.

The contact of switch 388 is connected by lead 422 to one side of the coil for relay 377 and the other side of this coil is connected by line 423 to ground through battery 424. The pole piece of relay switch 391 is connected by lead 425 to a ring current source 426 and the contact of this switch is connected by lead 427 to bank 309.

The contact of relay switch 385 is connected to ground line 428 and in connecting the locking unit shown in FIG. 1 to the connector of the step-by-step switching system shown in FIG. 3, the pole piece of this switch 385 is electrically connected to the pulsing lead 32. Lead 68, on the other hand, is connected to a line tap in lead 412 while lead 49 is connected to a line tap in lead 394. The lead 54 to the locking unit is connected to a line tap in lead 392 while lead 59 is connected to a line tap in lead 400. Lead 55 is connected to a line tap in lead 403 and the sleeve lead 70 is connected to a line tap in lead 416.

To provide a talking circuit 283 between the calling and called parties, leads 409 and 400 are connected in the switching unit by a capacitor 430 containing lead 429 while leads 403 and 407 are interconnected by a capacitor 432 containing lead 431. This provides a capacitance coupling between the calling and called party loop circuits that are energized during establishment of the talking circuit through the connector switching unit.

In the normal process of completing a telephone communication circuit between the calling and called party telephones through the step-by-step central office exchange equipment, the calling party closes the hook switch 309 as the receiver and transmitter are lifted to initiate the call. When this happens a series circuit is completed from ground line 331 through switches 318 and 319 to battery containing ground line 333 and relay 303 is energized. Switch 335 is accordingly actuated and completes a circuit that activates the line finder 316 and which results in the grounding of lead 315 to complete a circuit that activates relay 302.

When relay 302 is energized switches 318 and 319 open and thus break the circuit that energizes relay 303. Simultaneously, switches 316 and 317 are closed to complete the link between the calling party telephone and line finder 315. Once this is completed, the calling party dials the called party's telephone number. This, of course, actuates the selector systems until a link is established with the selected relay control unit. When the unit such as that depicted in FIG. 3 is initially selected during the dialing process, it completes the calling pary loop circuit 284 through relay 375 from ground line 408 through switch 380, switch 316, telephone 300, switch 317, switch 379, and battery containing ground line 405 that energizes relay 375 and closes switches 386, 387 and 388. When switch 386 closes a circuit that includes lead 435 is energized and which readies the switching bank 309 for response to the last two digits dialed by the calling party.

Relay 376 operates under the control of relay 375 to maintain the sleeve circuits. When switch 387 closes in response to relay 375, relay 376 is energized and this, of course, causes switches 389 and 390 to close and energize the circuitry 282 that energizes the line holding means. When switch 389 closes, the calling party's sleeve circuit 286 from ground line 413 to battery containing ground line 314 is completed and this locks in the central office equipment and maintains the holding relay 302 in an energized condition. When switch 390 closes line 414 is grounded to ground line 413 so that the sleeve circuit 287 for the called party is ready for completion through the bank 309 to line 437.

When switch 388 closes in response to relay 375 the circuit involving ground line 397, switch 384, lead 417, switch 388, lead 422 and battery containing ground line 423 is energized and this actuates relay 377. This in turn closes switch 391 and connects the ring current source 426 to the connector bank 309 through lead 427 and places the ring circuit ready for completion as the last two digits are dialed by the calling party.

When the dialing process is completed, the called party's sleeve circuit 287, readied by the closure of switch 390, is completed through the bank 309 and via leads 437 and 371 to battery containing ground line 372, and the ring circuit, readied by the closure of switch 391, is completed through the bank 309 to lead 354 via lead 370. Simultaneously, lead 400 is electrically connected to lead 367 and lead 368 is electrically connected to lead 403.

With the completion of the called party's sleeve circuit 287 through bank 309, relay 304 is energized and switches 349 and 350 are opened to disconnect the circuit of relay 305 from the telephone while switches 351 and 352 are closed.

When switches 351 and 352 close in response to the action of relay 304 a ring circuit is completed between source 426 and ground line 404 through switches 391 and 352 and which energizes the telephone bell 345. Thereafter, in the normal sequence of events involved in the completion of the telephone communication circuit, the called party closes switch 340 in response to the audio summons of bell 345. When this happens it completes the called party loop circuit 285 between ground line 404 and battery containing line 401 through switches 351, 352 and 340, and the ring and tip lines of the called party and energizes relay 374. This, of course, results in the actuation of switches 379, 380, 381, 382, 383, 384 and 385.

When switches 379 and 380 open and switches 381 and 382 close, the current in the energized loop circuit 284 servicing the calling party's telephone is reversed for reasons well known in the art. When switch 384 opens in response to the action of relay 374 the circuit energizing relay 377 is broken and switch 391 opens. This disconnects the ringing current source 426 from the called party's telephone. When switch 385 closes the sensing circuit 145 for relay 15 of the auxilliary unit is placed in the ready condition.

When switch 383 closes an auxiliary ground connection is provided for the sleeve circuit 286 and 287 servicing the calling and called party telephones.

As the talking circuit 283 is completed through the connector by the closure of switch 340, relay 374 is energized as previously indicated and thus forms a component of the energized called party loop circuit 285 that includes the hook switch 340 and the called party's dial pulse signal generator 343. Relay 375 under such circumstances is also energized and forms a component of the energized calling party loop circuit 284 that includes the calling party's hook switch 309 as well as the calling party's ring and tip lines. When the talking circuit 283 is complete relay 376 remains operatively energized respective circuit and switches 389 and 390 form completing components of the calling party and called party sleeve circuits 286 and 287 that retain the central office equipment in a locked condition to maintain the talking circuit through capacitor 430 and 432.

When the talking circuit between the calling and called party telephones is complete, the loop circuit components of the talking circuit are energized as previously indicated. All the called party has to do to actuate the alarm unit is manually manipulate the dialing component 343 and dial the number or digit five. When this happens the loop circuit 285 energizing relay 374 is momentarily broken by the pulse signal and switch 385 is successively opened and closed in response to each signal. This activates the pulse sensing circuit 145 as previously explained and causes wiper blade 28 to engage contact 35 to complete a circuit 167 which energizes relay 18. When this happens switches 40 through 48 inclusive are closed and the closure of switch 44 completes and energizes the locking circuit 129 which can thereafter only be opened by the manipulation of switch 19. It may be mentioned at this point that relay 376 like relay 191 is a slow release relay so that switches responsive to the relay remain closed when the called party's energized loop circuit 285 is broken momentarily by the actuation of the pulse generator.

Switch 45 is connected to the sleeve circuit 286 servicing the calling party in parallel with switch 389 and hence when switch 45 is closed in response to the relay action it completes an electrically conductive path 125 in the circuit 286 which is in parallel with the switch 289 and maintains the calling party's sleeve circuit 286 energized. Switch 46 is connected to the sleeve circuit 287 of the called party in parallel with switch 390 and hence when this switch 46 closes in response to relay 18 it completes an electrically conductive path 126 in circuit 287 which is parallel with switch 290 and serves to maintain the energized condition of the called party's sleeve circuit 287.

When switches 40 and 41 are closed by the relay action they form components of an electrically conductive path 127 that includes lead 65 and which is connected in the calling party loop circuit 284 in parallel with the calling party's hook switch 309 therein. Similarly, when switches 42 and 43 close in response to the action of relay 18, they form components of an electrically conductive path 128 that includes lead 63 and which is connected in the called party's loop circuit 287 in parallel with the called party's hook switch 340 therein.

In a completed communication circuit involving a step-by-step central office exchange it is possible to trace the called and calling parties involved in the completed communication circuit if the sleeve circuits are maintained in an energized condition even though the respective ring and tip lines of the calling and called parties are not shorted out. Similarly, it is possible to maintain the energized condition of the calling party sleeve circuit by simply shorting out the calling party's tip and ring lines so that relay 375 remains energized even though the calling party hangs up and thus opens the hook switch 309. This, of course, would make it impossible to trace the called party and hence when the principles of the invention are applied to a communication circuit which is established through a step-by-step central office exchange, switching means should be provided to maintain the energy condition of both of the sleeve circuits or alternatively, switching means should be provided to short out the ring and tip lines of each of the calling and called party telephones so that the relays 374, 375 and 376 remain energized even though one or the other of the communicating parties hangs up and thus opens the hook switch. In the preferred practice of the invention, switching means that maintains the energy conditions of the sleeve circuits and simultaneously shorts out the ring and tip lines of the calling and called parties is used.

The closure of switches 40 and 41, as previously explained, couple the communication circuit which involve recorder 20 to the ring and tip lines of the talking circuit established between the calling and called parties and permits the conversation to be recorded while the closure of switches 42 and 43 couples the talking circuit involving inductance 21 to telephone 23 as well as to the remotely located surveillance telephone serviced by leads 106 and 112.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A telephone communication system comprising (a) a calling party telephone having a first hook switch, (b) a called party telephone having a second hook switch and dialing means, and (c) central office exchange equipment completing a talking circuit between the calling and called party telephones and establishing energized circuits that comprise (1) a calling party loop circuit which includes said first hook switch and first relay means operating under the control of said first hook switch, (2) a called party loop circuit which includes said second hook switch and said dialing means, (3) a calling party sleeve circuit which includes line holding means associated with the calling party telephone and operating to maintain the calling party loop circuit, and (4) a called party sleeve circuit which includes line holding means associated with the called party telephone and operating to maintain the called party loop circuit; said exchange equipment comprising (a) selectable circuit completing control units for controlling the maintenance of respective talking circuits completed between calling and called telephones, and (b) automatic selector means for selecting one of said units, said control units including a selected control unit completing and operating in dependency upon closed conditions of the first hook switch and the second hook switch to maintain said energized circuits, said control unit comprising (a) said first relay means, (b) second relay means operating under the control of said first relay means to maintain the calling and called party sleeve circuits, (c) first switching means actuated by said second relay means and completing the calling and called party sleeve circuits, and (d) capacitance means coupling the calling and called party loop circuits and therewith completing said talking circuit, said dialing means being manipulatable by the called party to generate signals in the called party loop circuit that are respectively associated with the digits in telephone numbers, said system further comprising an auxiliary unit associated with each of said control units and which is actuatable by the called party for controlling the maintenance of the energized calling and called party sleeve circuits, completed through the control unit associated therewith and the auxiliary unit associated with said selected control unit including (a) signal detecting means for detecting said signals in the called party loop circuit, and (b) second switching means connected to the first switching means and actuatable to complete an electrically conductive path in at least one of the sleeve circuits, said path being in parallel with said first switching means therein, and said detecting means being responsive to the detection of a predetermined one of said signals to control the actuation of said second switching means.

2. A telephone communication system in accord with claim 1 where the energized called party loop circuit includes third relay means operating under the control of the second hook switch and dialing means, where said control unit includes (a) said third relay means, and (b) third switching means actuated and controlled by said third relay means, where manipulation of said dialing means to generate the predetermined signal produces a predetermined number of circuit breaking pulses in said called party loop circuit, where said third relay means is responsive to said pulses and actuates said third switching means in response to each of said pulses, where the auxiliary unit associated with said selected control unit includes an open circuit which comprises fourth relay means that is operated by completion of the open circuit, where said second switching means is connected in said control unit to the calling party sleeve circuit and actuatable by said fourth relay means to complete said electrically conductive path in said calling party sleeve circuit and in parallel with the first switching means therein, and where said signal detecting means includes (a) a pulse sensing circuit that comprises said third switching means, and (b) fourth switching means responsive to said sensing circuit and actuatable to complete said open circuit upon the actuation of said third switching means in response to said predetermined number of pulses.

3. A telephone communication system in accord with claim 2 where the auxiliary unit associated with said selected control unit includes fifth switching means operated by the fourth relay means, a relay locking circuit energized by operation of the fifth switching means for maintaining the fourth relay means operatively energized, and where the relay locking circuit includes the fourth relay means and normally closed sixth switching means manipulatable to break the relay locking circuit.

4. A telephone communication system in accord with claim 1 where the energized called party loop circuit includes third relay means operating under the control of the second hook switch and dialing means, where said control unit includes (a) said third relay means, and (b) third switching means actuated and controlled by said third relay means, where manipulation of the dialing means to generate the predetermined signal produces a predetermined number of circuit breaking pulses in said called party loop circuit, where said third relay means is responsive to said pulses and actuates said third switching means in response to each of said pulses, where the auxiliary unit associated with said selected control unit includes an open circuit which comprises fourth relay means that is operated by completion of the open circuit, where said second switching means is connected in the control unit to the called party sleeve circuit and actuatable by said fourth relay means to complete said electrically conductive path in the called party sleeve circuit and in parallel with the first switching means therein, and where said signal detecting means includes (a) a pulse sensing circuit that comprises said third switching means, and (b) fourth switching means responsive to said sensing circuit and actuatable to complete said open circuit upon the actuation of said third switching means in response to said predetermined number of pulses.

5. A telephone communication system in accord with claim 4 where the auxiliary unit associated with said selected control unit includes fifth switching means operated by the fourth relay means, a relay locking circuit energized by operation of the fifth switching means for maintaining the fourth relay means operatively energized, where the relay locking circuit includes said fourth relay means and normally closed sixth switching means manipulatable to break the relay locking circuit.

6. A telephone communication system in accord with claim 1 where the energized called party loop circuit includes third relay means operating under the control of the second hook switch and the dialing means, where said control unit includes (a) said third relay means, and (b) third switching means actuated and controlled by said third relay means, where manipulation of said dialing means to generate the predetermined signal produces a predetermined number of circuit breaking pulses in said called party loop circuit, where said third relay means is responsive to said pulses and actuates said third switching means in response to each of said pulses, where the auxiliary unit associated with said selected control unit includes an open circuit which comprises fourth relay means that is operated by completion of the open circuit, where said second switching means is connected in the control unit to both of the calling and called party sleeve circuits and to both of the calling and called party loop circuits and is actuatable by the fourth relay means to complete (a) said electrically conductive path in the calling party sleeve circuit and in parallel with the first switching means therein, (b) another electrically conductive path in the called party sleeve circuit which is in parallel with the first switching means therein, (c) another electrically conductive path in the calling party loop circuit which is in parallel with the first hook switch therein, and (d) another electrically conductive path in the called party loop circuit which is in parallel with the second hook switch therein, and where said signal detecting means includes (a) a pulse sensing circuit that comprises said third switching means, and (b) fourth switching means responsive to said sensing circuit and actuatable to complete said open circuit upon the actuation of said third switching means in response to said predetermined number of pulses.

7. A telephone communication system in accord with claim 6 where the auxiliary unit associated with said selected control unit includes fifth switching means operated by the fourth relay means, a relay locking circuit energized by operation of the fifth switching means for maintaining the fourth relay means operatively energized, where the relay locking circuit includes said fourth relay means and normally closed sixth switching means manipulatable to break the relay locking circuit.

8. A telephone communication system in accord with claim 1 where manipulation of said dialing means to generate the predetermined signal produces a predetermined tone signal in the talking circuit, where the auxiliary unit associated with said selected control unit includes a first circuit which comprises third relay means that is operated by completion of said first circuit, where said second switching means is connected in the control unit to both of the calling and called party sleeve circuits and is actuatable by the third relay means to complete (a) said electrically conductive path in the calling party sleeve circuit and in parallel with the first switching means therein, and (b) another electrically conductive path in the called party sleeve circuit which is in parallel with the first switching means therein, and where said signal detecting means includes fourth relay means coupled to the talking circuit in said control unit for controlling the completion of said first circuit in response to the production of said predetermined tone signal in said talking circuit.

9. A telephone communicaton system in accord with claim 8 where said second switching means is also connected in the control unit to both of the calling and called party loop circuits and is actuatable by the third relay means to also complete (a) an electrically conductive path in the calling party loop circuit which is in parallel with the first hook switch therein, and (b) an electrically conductive path in the called party loop circuit which is in parallel with the second hook switch therein.

10. A telephone communication system in accord with claim 9 where the auxiliary unit associated with the selected control unit includes third switching means operated by the third relay means, a relay locking circuit energized by operation of the third switching means for maintaining the third relay means operatively energized, where the relay locking circuit includes said third relay means and normally closed fourth switching means manipulatable to break the relay locking circuit.

11. A telephone communication system in accord with claim 8 where the system further comprises a monitoring system having a communication circuit that is coupled to the talking circuit by actuation of said third relay means.

12. A telephone communication system in accord with claim 11 where the communication circuit includes voice recording means.

13. A telephone communication system in accord with claim 11 where the communication circuit includes another called party telephone.

14. A telephone communication system in accord with claim 8 where the auxiliary unit associated with said selected control unit includes third switching means operated by the third relay means, a relay locking circuit energized by operation of the third switching means for maintaining the third relay means operatively energized, where the relay locking circuit includes said third relay means and normally closed fourth switching means manipulatable to break the relay locking circuit.

15. A telephone communication system in accord with claim 1 where the energized called party loop circuit includes third relay means operating under the control of the second hook switch and the dialing means, where said control unit includes (a) said third relay means, and (b) third switching means actuated and controlled by said third relay means, where manipulation of said dialing means to generate the predetermined signal produces a predetermined number of circuit breaking pulses in said called party loop circuit, where said third relay means is responsive to said pulses and actuates said third switching means in response to each of said pulses, where said auxiliary unit includes an open circuit which comprises fourth relay means that is operated by completion of the open circuit, where said second switching means is connected in the control unit to both of the calling and called party sleeve circuits and is actuatable by the fourth relay means to complete (a) said electrically conductive path in the calling party sleeve circuit and in parallel with the first switching means therein, and (b) another electrically conductive path in the called party sleeve circuit which is in parallel with the first switching means therein, and where said signal detecting means includes (a) a pulse sensing circuit that comprises said third switching means, and (b) fourth switching means responsive to said sensing circuit and actuatable to complete said open circuit upon the actuation of said third switching means in response to said predetermined number of pulses.

16. A telephone communication system in accord with claim 15 where the auxiliary unit associated with the selected control unit includes fifth switching means operated by the fourth relay means, a relay locking circuit energized by operation of the fifth switching means for maintaining the fourth relay means operatively energized, where the relay locking circuit includes said fourth relay means and normally closed sixth switching means manipulatable to break the relay locking circuit.

17. A telephone communication system comprising (a) a calling party telephone having a first hook switch, (b) a called party telephone having a second hook switch and dialing means, and (c) central office exchange equipment completing a talking circuit between the calling and called party telephones and establishing energized circuits that comprises (1) a calling party loop circuit which includes said first hook switch and first relay means operating under the control of said first hook switch, (2) a called party loop circuit which includes said second hook switch and said dialing means, (3) a called party sleeve circuit operating to maintain the calling party loop circuit, and (4) a called party sleeve circuit operating to maintain the called party loop circuit; said exchange equipment comprising (a) selectable circuit completing control units for controlling the maintenance of respective talking circuits completed between calling and called party telephones, and (b) automatic selector means for selecting one of said units, said control units including a selected control unit completing and operating in dependency upon the closed conditions of the first hook switch and the second hook switch to maintain said energized circuits, said control unit comprising (a) said first relay means, (b) second relay means operating under the control of the first relay means to maintain the calling and called party sleeve circuits, and (c) capacitance means coupling the calling and called party loop circuits and therewith completing said talking circuit, and said dialing means being manipulatable by the called party to generate in the called party loop circuit signals that are associated with the respective digits in telephone numbers, said system further comprising an auxiliary unit associated with each of said control units and which is actuatable by the called party for controlling the maintenance of the energized calling and called party sleeve circuits completed through the control unit associated therewith, the auxiliary unit associated with said selected control unit including (a) first switching means connected in the control unit to the energized calling party loop circuit and actuatable to complete an electrically conductive path in said calling party loop circuit that is in parallel with the first hook switch included therein, and (b) signal detecting means connected in the control unit to detect said signals in the called party loop circuit, and said detecting means being responsive to the detection of a predetermined one of said signals to control the actuation of said first switching means.

18. A telephone communication system in accord with claim 12 where the energized called party loop circuit includes third relay means operating under the control of the second hook switch and dialing means, where said control unit includes (a) said third relay means, and (b) second switching means actuated and controlled by said third relay means, where manipulation of said dialing means to generate the predetermined signal produces a predetermined number of circuit breaking pulses in said called party loop circuit, where said third relay means is responsive to said pulses and actuates said second switching means in response to each of said pulses, where the auxiliary unit associated with the selected control unit includes an open circuit which comprises fourth relay means that is operated by completion of the open circuit, where said first switching means is actuatable by said fourth relay means to complete said electrically conductive path in the calling party loop circuit, and where said signal detecting means includes (a) a pulse sensing circuit that comprises said second switching means, and (b) third switching means responsive to said sensing circuit and actuatable to complete said open circuit upon the actuation of said second switching means in response to said predetermined number of pulses.

19. A telephone communication system in accord with claim 18 where the auxiliary unit associated with said selected control unit includes fourth switching means operated by the fourth relay means, a relay locking circuit energized by operation of the fourth switching means for maintaining the fourth relay means operatively energized, where the relay locking circuit includes said fourth relay means and normally closed fifth switching means manipulatable to break the relay locking circuit.

20. A telephone communication system in accord with claim 17 where the energized called party loop circuit includes third relay means operating under the control of the second hook switch and the dialing means, where said control unit includes (a) said third relay means, and (b) second switching means actuated and controlled by said third relay means, where manipulation of said dialing means to generate the predetermined signal produces a predetermined number of circuit breaking pulses in said called party loop circuit, where said third relay means is responsive to said pulses and actuates said second switching means in response to each of said pulses, where the auxiliary unit associated with the selected control unit includes an open circuit which comprises fourth relay means that is operated by completion of the open circuit, where said first switching means is connected in the control unit to both of the calling and called party loop circuits and is actuatable by said fourth relay means to complete (a) said electrically conductive path in the calling party loop circuit, and (b) another electrically conductive path in the called party loop circuit which is in parallel with the second hook switch therein, and where said signal detecting means includes a pulse sensing circuit that comprises (a) said second switching means, and (b) third switching means responsive to said sensing circuit and actuatable to complete said open circuit upon the actuation of said second switching means in response to said predetermined number of pulses.

21. A telephone communication system in accord with claim 20 where the system further comprises a monitoring system having a communication circuit that is coupled to the talking circuit by actuation of said fourth relay means.

22. A telephone communication system in accord with claim 21 where the communication circuit includes voice recording means.

23. A telephone communication system in accord with claim 21 where the communication circuit includes another called party telephone.

24. A telephone communication system in accord with claim 20 where the auxiliary unit associated with the selected control unit includes fourth switching means operated by the fourth relay means, a relay locking circuit energized by operation of the fourth switching means for maintaining the fourth relay means operatively energized, where the relay locking circuit includes said fourth relay means and normally closed fifth switching means manipulatable to break the relay locking circuit.

25. A telephone communication system in accord with claim 17 where manipulation of said dialing means to generate the predetermined signal produces a predetermined tone signal in the talking circuit, where the auxiliary unit associated with the selected control unit includes a first circuit which comprises third relay means that is operated by completion of said first circuit, where said first switching means is connected in the control unit to both of the calling and called party loop circuits and is actuatable by the third relay means to complete (a) said electrically conductive path in the calling party loop circuit, and (b) another electrically conductive path in the called party loop circuit which is in parallel with the second hook switch therein, and where said signal detecting means includes fourth relay means coupled to the talking circuit in said control unit for controlling the completion of said first circuit in response to the production of said predetermined tone signal in said talking circuit.

26. A telephone communication system in accord with claim 25 where the auxiliary unit associated with said selected control unit includes second switching means operated by the third relay means, a relay locking circuit energized by operation of the second switching means for maintaining the third relay means operatively energized, where the relay locking circuit includes said third relay means and normally closed third switching means manipulatable to break the relay locking circuit.

* * * * *

PO-1050
(5/69)

UNITED STATES PATENT OFFICE
CERTIFICATE OF CORRECTION

Patent No. 3,795,774 Dated March 5, 1974

Inventor(s) Earl J. Talbot

It is certified that error appears in the above-identified patent and that said Letters Patent are hereby corrected as shown below:

Column 4, Line 42, "sole" should read -- pole --.
Column 5, Line 28, "wich" should read -- which --.
Column 7, Line 16, "tht" should read -- that --.
Column 8, Line 39, after "and" insert -- line --.
Column 9, Line 18, after "relay" insert -- 132 --;
Line 46, cancel "to" (first occurrence) and substitute -- by --.
Column 10, Line 60, after "actuated" insert -- and operated --
Column 19, Line 46, cancel "respective circuit";
Line 47, after "form" insert -- respective circuit --.

Signed and sealed this 13th day of August 1974.

(SEAL)
Attest:

McCOY M. GIBSON, JR.
Attesting Officer

C. MARSHALL DANN
Commissioner of Patents